(No Model.) 3 Sheets—Sheet 1.
T. D. PEASLEY.
AUTOMATIC GRAIN MEASURE.
No. 391,072. Patented Oct. 16, 1888.
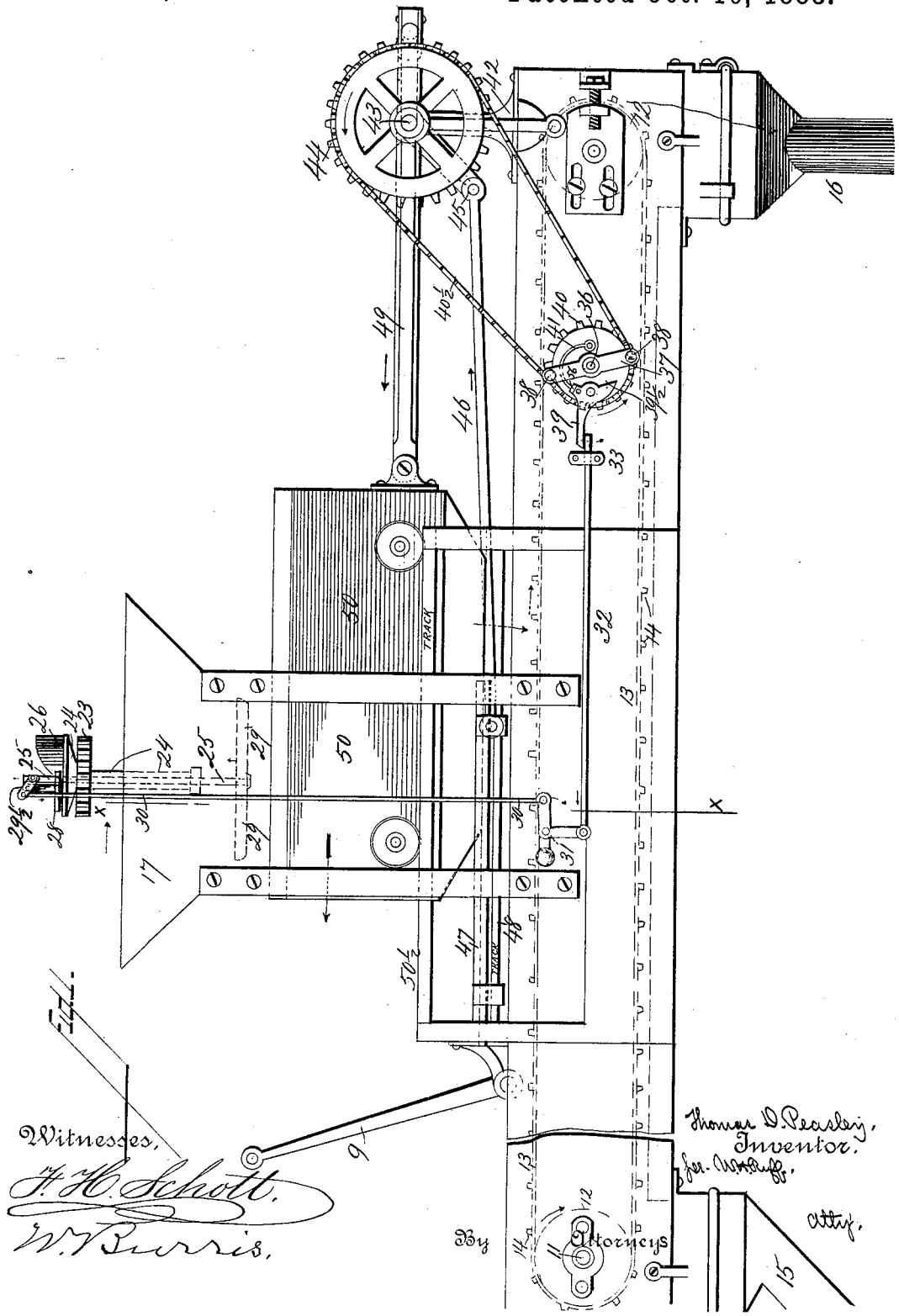

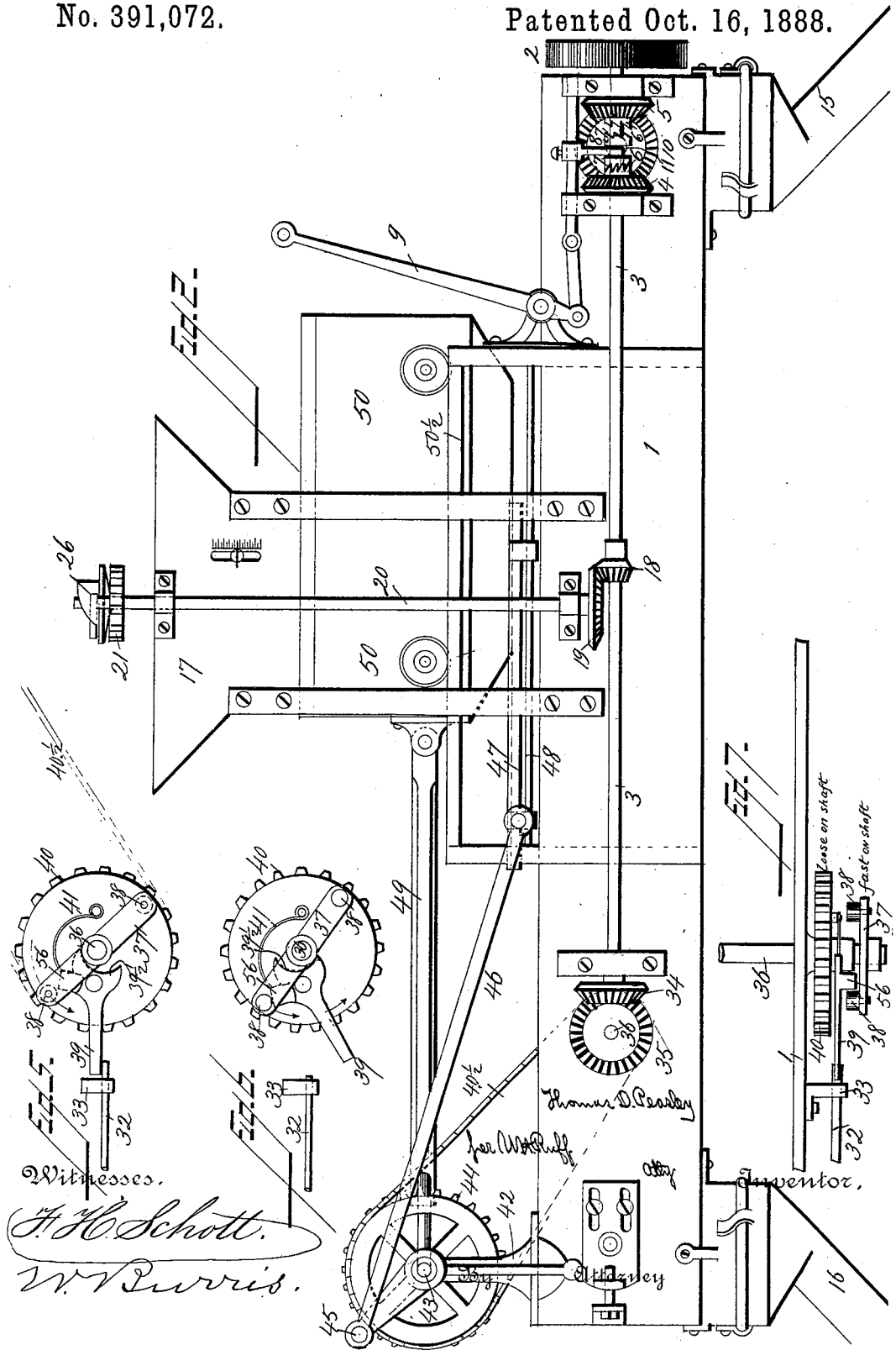

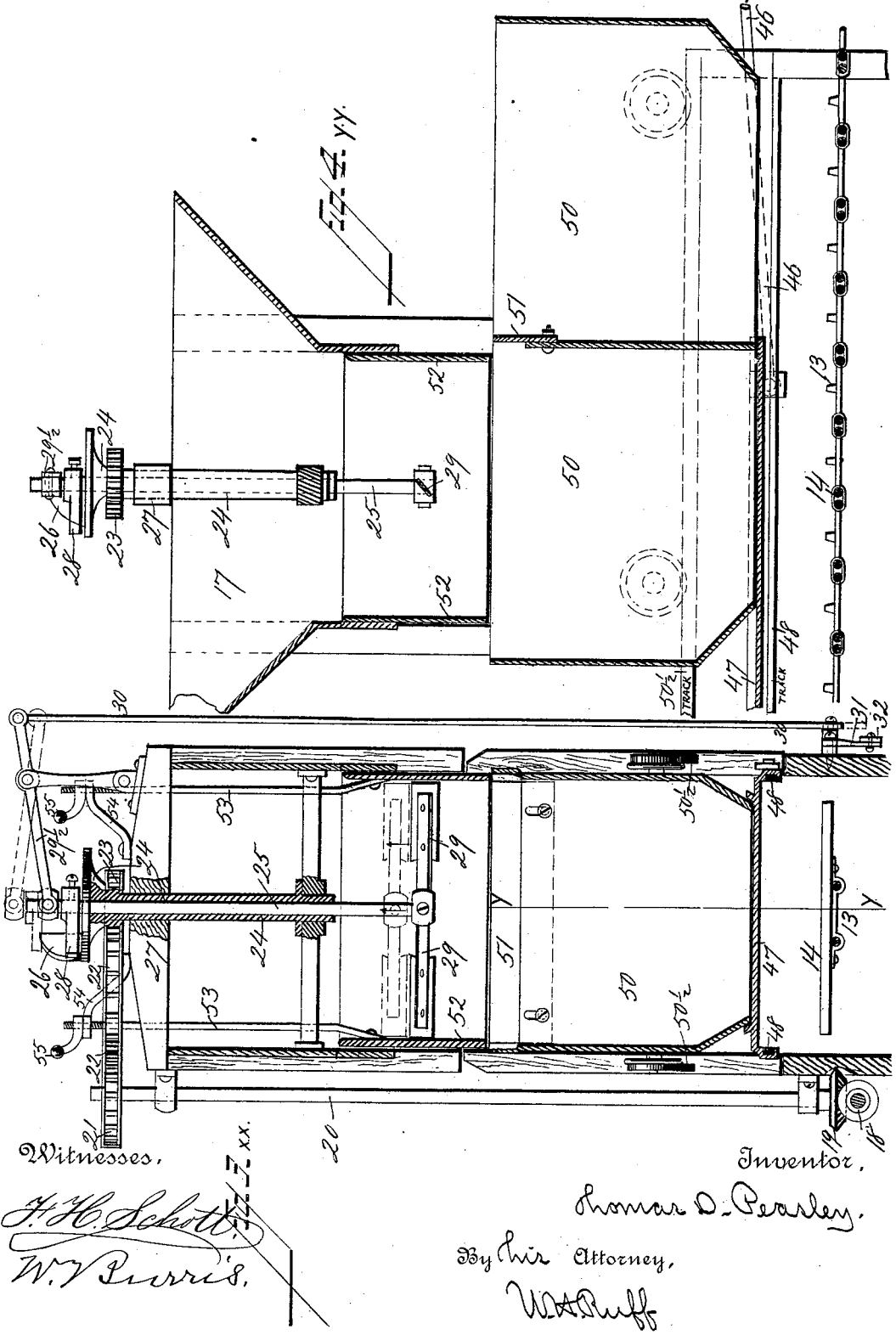

UNITED STATES PATENT OFFICE.

THOMAS D. PEASLEY, OF DOWNS, ILLINOIS.

AUTOMATIC GRAIN-MEASURE.

SPECIFICATION forming part of Letters Patent No. 391,072, dated October 16, 1888.

Application filed February 7, 1888. Serial No. 263,300. (No model.)

*To all whom it may concern:*

Be it known that I, THOMAS D. PEASLEY, of Downs, in McLean county, and State of Illinois, have invented certain new and useful Improvements in Automatic Grain-Measures; and I do hereby declare that the following is a full, clear, and exact description thereof, reference being had to the accompanying drawings, and to the letters of reference marked thereon, making a part of this specification.

My invention relates to an improvement in automatic grain-measuring devices, the object of the same being to provide a machine of this character by means of which grain may be measured and simultaneously conveyed to a suitable receptacle.

With the above ends in view my invention consists in the certain features of construction and combinations of parts, as will be hereinafter fully described, and pointed out in the claims.

In the accompanying drawings, Figures 1 and 2 are side views of the machine. Fig. 3 is a vertical section on line $x$ $x$ of Fig. 1. Fig. 4 is a section on line $y$ $y$ of Fig. 3. Fig. 5 is a detached view showing stop-dog on trip-rod. Fig. 6 is a detached view showing dog released from rod, and Fig. 7 is a detached view showing construction of dog and actuating-arm.

Number 1 represents the conveyer, to one side of which is secured the band-pulley 2 on the shaft 3. Bevel gear-wheels 4 and 5 are journaled on said shaft, and are provided with the teeth 6 to engage teeth 7 on the reversing-clutch 8, which is keyed to said shaft, the clutch being operated by means of lever 9. The said gear-wheels 4 and 5 mesh with the pinion 10 on shaft 11, carrying the sprocket-wheel 12, to which is attached the belt 13, having the fingers 14 attached thereto for the purpose of conveying the grain to the chutes 15 and 16. The object of the reversing mechanism is to enable the operator to reverse the direction of the belt 13 from one chute to another, as desired.

To the shaft 3, near center of hopper 17, is secured the bevel gear-wheel 18, gearing with the bevel gear-wheel 19 on the rod 20, to the top of which is secured the sprocket-wheel 21, carrying sprocket-chain 22, which also engages the sprocket-wheel 23 on the sleeve 24. The rod 25 is journaled in the sleeve 24, which in turn is mounted in a vertical sleeve-bearing, 27. The sleeve 24 is provided at its upper end with the cam 26, adapted to engage stud 28 on rod 25. The lower end of the rod 25 is provided with the inclined flaring arms 29, the object thereof being to elevate the rod 25 when the measure is filled with the desired quantity of grain. The sleeve 24 receives motion through the rod 20 and chain 22, as described, and imparts a rotary motion to the rod 25 by means of the cam 27 and stud 28. To the upper end of rod 25 is pivoted the balance-lever 29½, the opposite end of which is connected with the rod 30, which connects with the weighted angle-lever 31. To the lower end of the lever 31 is secured the trip-rod 32, with its free end mounted in lug 33.

To the end of the shaft 3 is keyed the bevel gear-wheel 34, gearing with a similar wheel, 35, on shaft 36. To the opposite end of shaft 36 is keyed the arms 37, having inwardly-projecting lugs 38, adapted to engage the dog 39 at required intervals. The dog 39 is pivoted to the sprocket-wheel 40, the latter being mounted on shaft 36, adjacent to the arms 37. To the wheel 40 is secured the spring 41, bearing against the dog 39, thereby maintaining the same in position.

To the conveyer-frame are secured the standards 42, in which is mounted the crank-shaft 43, to one end of which is keyed the sprocket-wheel 44, the same having twice the circumference of sprocket-wheel 40, and is connected therewith by the sprocket-chain 40½. To the opposite end of said shaft is keyed the arm 45, to which is pivoted the way-bar 46, the end of said bar being pivotally secured to the sliding plate 47, running on a suitable track, 48. To the crank of shaft 43 is loosely secured the way-bar 49, the opposite end thereof being pivotally secured to the measure-box 50.

The box 50 runs on suitable tracks, 50½, and is provided with an adjustable partition, 51, so that the dimensions may be increased or decreased according to the varying weight of grain when weight is to be estimated.

The striker 52 has four sides, as shown, and is adjustable within the box 50 by means of the rods 53, which are screw-threaded at their upper ends and pass through the supports 54. The upper ends of the rods are provided with the screw-threaded cranks 55, by means of which the packer is raised or lowered to give more or less grain to the measure, as desired.

The operation of the machine is as follows: The driving-power is communicated by means of band-wheel 2 to the shaft 3, which will cause the gear-wheels 18 and 19 to rotate the rod 20. The sprocket-chain 22, connecting the rod 20 and the sleeve 24, will impart motion thereto. The cam 27 on said sleeve will engage stud 28 and cause the rod 25 to rotate, thereby giving a rotary and sweeping motion to the arms 29. The grain, when directed into the hopper 17, will gradually flow into and fill the measure opposite the hopper, and as it is filling, the arms 29, which are constantly in motion, will rise with the grain until the measure is filled, at which moment the rod 25 will have ascended sufficiently to depress the outer end of the lever 29½, which, through the rod 30 and the crank-lever 31, will draw the trip-rod 32 away from the stop-dog 39, thereby releasing the same, which will be thrown into line with lugs 38 on arms 37. The latter, being keyed on shaft 36, will carry the dog one revolution, which will also cause the wheel 40 to turn and communicate motion to the plate and measure-box by the means above described. The weight on the lever 31 will throw the trip-rod into normal position and the dog will return and rest thereupon, thereby releasing the arms 37, which will pass the dog and throw the wheel 40 out of engagement. The construction of the dog is such that the lug 56 on the top thereof will enable the knobs 38 to slide over the lug when the dog is fast on the rod 32, thereby throwing wheel 40 out of gear and permitting the sliding plate 47 and the measure 50 to remain stationary. As soon as the dog 39 is released the arm 39½ will engage the squared portion of the axle of wheel 40 and impart motion thereto.

Way-bar 49 being attached to crank and measure-box, while the sliding plate being secured to way-bar 46 at a suitable angle to the crank, will move the same distance oppositely to the box 50, thereby enabling one of the boxes to be constantly under the hopper. When one measure is filled, it is moved as described, and the grain is emptied into the conveyer, from whence it is conveyed into either chute by means of the belt 14. As the measure passes from beneath the hopper it is leveled off by means of the striker 52.

An indicator of any preferred construction may be placed upon the machine for registering the quantity of grain measured.

Having fully described my invention, what I claim as new, and desire to secure by Letters Patent, is—

1. In a grain-measuring device, the combination, with measure-boxes and an adjustable partition separating the two, of an adjustable striker located in the boxes, substantially as shown and described.

2. In a grain-measuring device, the combination, with a trip-rod and means for actuating the rod, of measure-boxes and sliding-plate bottom, mechanism for oppositely reciprocating the boxes and bottom, a stop-dog adapted to engage the trip-rod and hold the boxes and bottom out of gear with the driving mechanism, substantially as shown and described.

3. In a grain-measuring device, the combination, with rotary arms and a trip-rod connected therewith, of a dog mounted on a shaft and adapted to engage said rod, and arms keyed to the shaft and adapted to engage said dog when released from trip-rod and lock the same to the shaft, substantially as shown and described.

4. In a grain-measuring device, the combination, with a hopper and the measure-boxes located beneath said hopper, of a sliding bottom for the boxes, and devices for simultaneously reciprocating the boxes and bottom in opposite directions, substantially as shown and described.

5. In a grain-measuring device, the combination, with a hopper, measure-boxes registering with the hopper, and a reciprocating bottom for the boxes, of revolving arms, a trip-rod connected therewith, a stop-dog adapted to engage said trip-rod, and means for releasing said stop-dog and causing the boxes and bottom to reciprocate in opposite directions, substantially as shown and described.

6. In a grain-measuring device, the combination, with a hopper, and arms located therein and connected with a trip-rod, of reciprocating measure-boxes, a sliding bottom therefor, and mechanism connecting the boxes and sliding bottom with the trip rod, whereby when the rod is moved the boxes and bottom will reciprocate in opposite directions, substantially as shown and described.

In testimony that I claim the foregoing I have hereunto set my hand this 19th day of January, 1888.

THOMAS D. PEASLEY.

Witnesses:
   THOS. SLADE,
   A. W. PEASLEY.